United States Patent
Kadaba et al.

(10) Patent No.: US 6,285,916 B1
(45) Date of Patent: Sep. 4, 2001

(54) MULTI-STAGE PARCEL TRACKING SYSTEM

(75) Inventors: Nagesh Kadaba; Hridai Moktan, both of Brookfield; Mark Patel, Norwalk, all of CT (US)

(73) Assignee: United Parcel Serivce of America, Inc., Atlanta, CA (US)

( * ) Notice: Subject to any disclaimer, the term of this patent is extended or adjusted under 35 U.S.C. 154(b) by 0 days.

(21) Appl. No.: 08/848,503

(22) Filed: Apr. 28, 1997

Related U.S. Application Data

(63) Continuation of application No. 08/323,118, filed on Oct. 14, 1994, now abandoned.

(51) Int. Cl.[7] .................................................. G06F 7/00
(52) U.S. Cl. .................... 700/222; 700/213; 700/214; 700/215; 700/216; 700/217; 700/218; 700/219; 700/220; 235/375; 235/378; 235/384; 235/385
(58) Field of Search ................... 235/375, 378, 235/380, 384, 385; 700/213–220, 222

(56) References Cited

U.S. PATENT DOCUMENTS

| | | |
|---|---|---|
| 4,005,400 | 1/1977 | Engdahl . |
| 4,588,881 | 5/1986 | Pejas et al. . |
| 4,628,193 | 12/1986 | Blum . |
| 4,634,845 | 1/1987 | Hale et al. . |
| 4,635,247 | 1/1987 | Tejima . |
| 4,651,150 | 3/1987 | Katz et al. . |
| 4,711,994 | 12/1987 | Greenberg . |
| 4,718,103 | 1/1988 | Shojima et al. . |
| 4,752,965 | 6/1988 | Dunkley et al. . |
| 4,783,740 | 11/1988 | Ishizawa et al. . |

(List continued on next page.)

FOREIGN PATENT DOCUMENTS

| | | |
|---|---|---|
| 0 369 188 | 5/1990 | (EP) . |
| 93302442 | 3/1993 | (EP) . |
| 0573018 | 12/1993 | (EP) . |
| 2 559 929 | 8/1985 | (FR) . |
| 2 676 846 | 11/1992 | (FR) . |
| 2 689 275 | 10/1993 | (FR) . |
| 2 038 524 A | 7/1980 | (GB) . |
| 63-312749 | 12/1988 | (JP) . |
| 4365155 | 12/1992 | (JP) . |
| PCT/GB88/00907 | 5/1989 | (WO) . |
| PCT/US93/06611 | 2/1994 | (WO) . |

OTHER PUBLICATIONS

IBM Technical Disclosure Bulletin vol. 37, No. 12, 12/94, .Real Time Audio Conferencing Under Windows 3.1, by Homewood et al.

IBM Technical Disclosure Bulletin vol. 37, No. 3, 03/94, .Compressed/ Encrypted Multimedia Objects Realtime Search and Retrieval., by Johnson et al.

IBM Technical Disclosure Bulletin vol. 37, No. 9, 09/94, . Memory Sharing in parallel Processing Environments., by Klenk.

Primary Examiner—William A Cuchlinski, Jr.
Assistant Examiner—McDieunel Marc
(74) Attorney, Agent, or Firm—Alston & Bird LLP

(57) ABSTRACT

A delivery tracking system for tracking parcels during an internal state of delivery within an organization after receipt of the parcel from a parcel delivery service. The system utilizes an intelligent, hand-held, portable data entry and data processing device to obtain signatures of recipients and scan codes printed on the parcel labels, and to respond to tracking inquiries prior to transferring collected information to a different computer. Data is entered on a touch-sensitive screen of personal digital assistant using the tip of a wand type bar code scanner.

13 Claims, 11 Drawing Sheets

U.S. PATENT DOCUMENTS

| | | |
|---|---|---|
| 4,832,204 | 5/1989 | Handy et al. . |
| 4,857,713 | 8/1989 | Brown . |
| 4,866,646 | 9/1989 | Nakamura et al. . |
| 4,899,137 | 2/1990 | Behrens et al. . |
| 4,927,986 | 5/1990 | Daly . |
| 5,031,098 | 7/1991 | Miller et al. . |
| 5,031,223 | 7/1991 | Rosenbaum et al. . |
| 5,038,283 | 8/1991 | Caveney . |
| 5,043,908 | 8/1991 | Manduley et al. . |
| 5,049,862 | 9/1991 | Dao et al. . |
| 5,068,787 | 11/1991 | Pipella et al. . |
| 5,068,797 | 11/1991 | Sansone et al. . |
| 5,072,400 | 12/1991 | Manduley . |
| 5,072,401 | 12/1991 | Sansone et al. . |
| 5,079,714 | 1/1992 | Manduley et al. . |
| 5,123,064 | 6/1992 | Hacker et al. . |
| 5,128,520 | 7/1992 | Rando et al. . |
| 5,153,842 | 10/1992 | Dlugos, Sr. et al. . |
| 5,204,958 | 4/1993 | Cheng et al. . |
| 5,216,233 | 6/1993 | Main et al. . |
| 5,218,187 | 6/1993 | Koenck et al. . |
| 5,218,188 | 6/1993 | Hanson . |
| 5,225,990 | 7/1993 | Bunce et al. . |
| 5,230,047 | 7/1993 | Frey et al. . |
| 5,262,939 | 11/1993 | Vanpoucke . |
| 5,267,147 | 11/1993 | Harshaw et al. . |
| 5,272,324 | 12/1993 | Blevins . |
| 5,276,315 | 1/1994 | Surka . |
| 5,278,399 | 1/1994 | Sano . |
| 5,283,819 | 2/1994 | Glick et al. . |
| 5,291,002 | 3/1994 | Agnew et al. . |
| 5,313,051 | 5/1994 | Brigida et al. . |
| 5,313,052 | 5/1994 | Watanabe et al. . |
| 5,317,628 | 5/1994 | Misholi et al. . |
| 5,329,102 | 7/1994 | Sansone . |
| 5,333,266 | 7/1994 | Boaz et al. . |
| 5,334,824 | 8/1994 | Martinez . |
| 5,388,210 | 2/1995 | Clayton et al. . |
| 5,388,264 | 2/1995 | Tobias, II et al. . |
| 5,416,520 | 5/1995 | Kuzma . |
| 5,420,379 * | 5/1995 | Zonk et al. .............................. 178/19 |
| 5,428,766 | 6/1995 | Seaman . |
| 5,432,776 | 7/1995 | Harper . |
| 5,479,000 * | 12/1995 | Dvorkis et al. ....................... 235/472 |

* cited by examiner

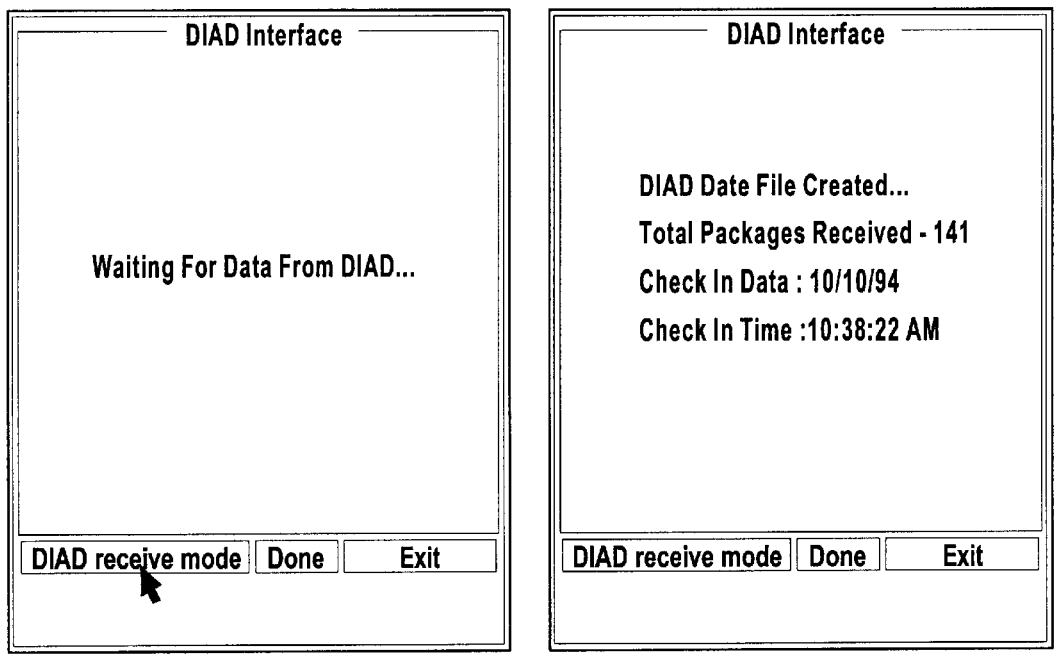
FIG. 4E  FIG. 4F
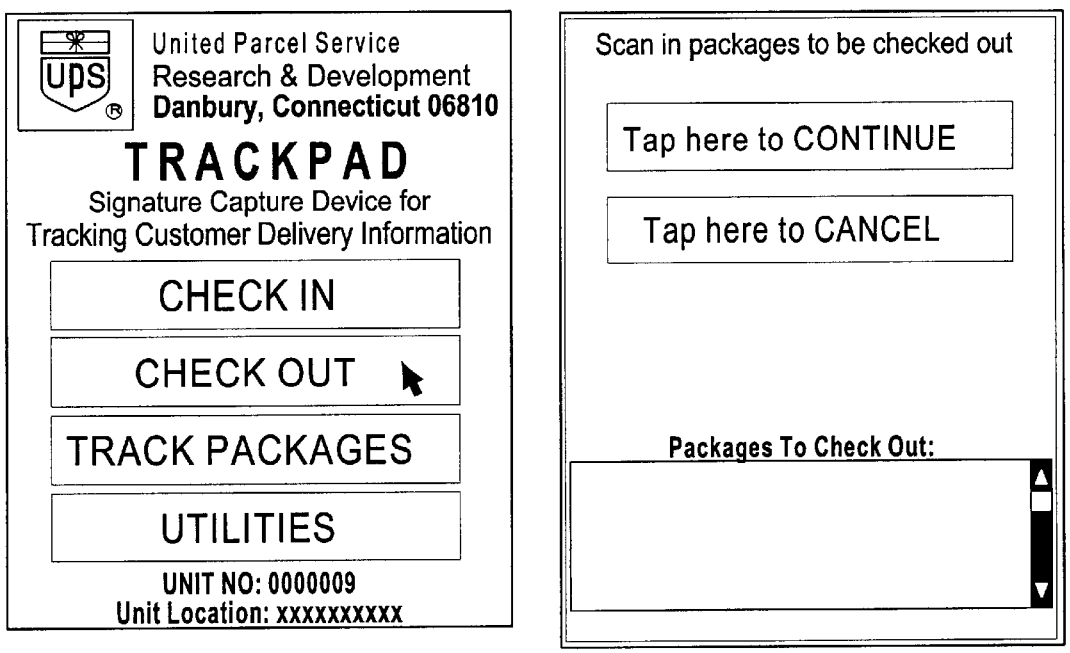
FIG. 5A  FIG. 5B

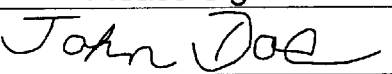
FIG. 5C  FIG. 5D
FIG. 5E  FIG. 5F

Management Reports

- Call Mgmt. Report
- Daily Excpt. Report
- Weekly Excpt. Report
- Exit Mgmt. Reports

FIG. 8D

Configuration

Site Information
- ID: RnD
- Address: 5153 Kenosia Ave. Danbury CT 06810

Phone Numbers
- Host: 2037316389
- FAX: 2037316340

Devices: Wand | Modem | Printer

Exit Configuration

FIG. 8E

Database Maintenance

- Purge Database
- Exit DB Maintenance

FIG. 8F

Sort By: Tracking Number

◇ Checking In Date & Time
◇ Checking Out Date & Time
◇ Shipper
◆ Tracking Number
◇ Service
◇ Status

| Tracking Number | Date | Time |
|---|---|---|
| 1939362 | | :57:0 |
| 1939362 | | :57:0 |
| 1939362 | | :57:0 |
| 19393629385 | 10/05/94 | 17:57:0 |
| 19393629387 | 10/05/94 | 17:57:0 |
| 19393629403 | 10/05/94 | 17:57:0 |
| 19393629421 | 10/05/94 | 17:57:0 |
| 19393629430 | 10/05/94 | 17:57:0 |
| 1Z0500580100032116 | 10/05/94 | 17:57: |
| 1Z196823130230 0383 | 10/05/94 | 17:57: |
| 1Z196823130230 0392 | 10/05/94 | 17:57: |
| 1Z196823130230 0409 | 10/05/94 | 17:57: |
| 1Z196823130230 0418 | 10/05/94 | 17:57: |
| 1Z196823130230 0427 | 10/05/94 | 17:57: |
| 1Z196823130230 0436 | 10/05/94 | 17:57: |
| 1Z196823130230 0445 | 10/05/94 | 17:57: |
| 1Z196823130230 0463 | 10/05/94 | 17:57: |
| 1Z196823130230 0481 | 10/05/94 | 17:57: |

Sort | Print | Exit

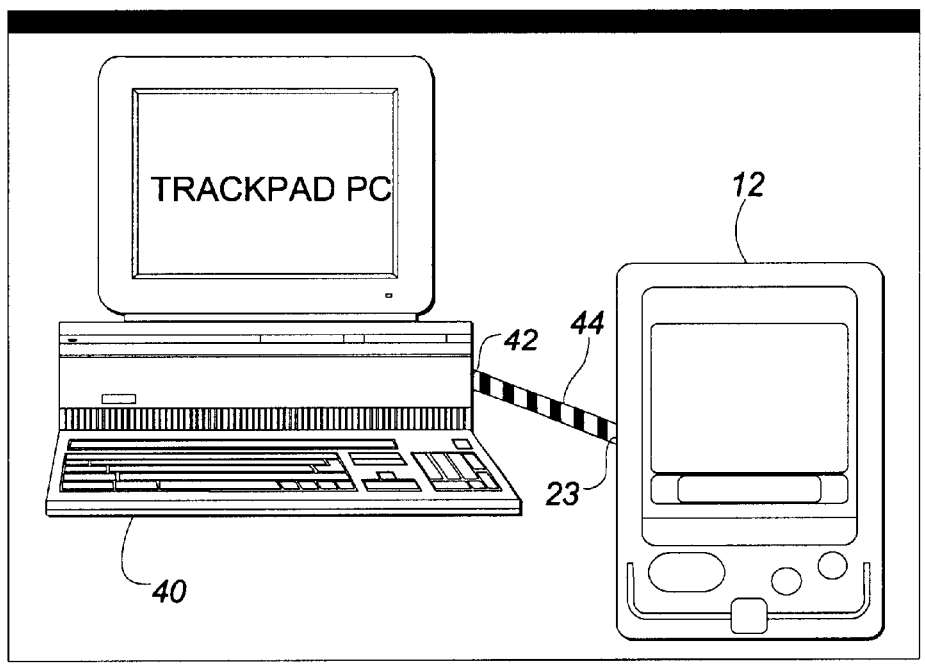
FIG. 9B
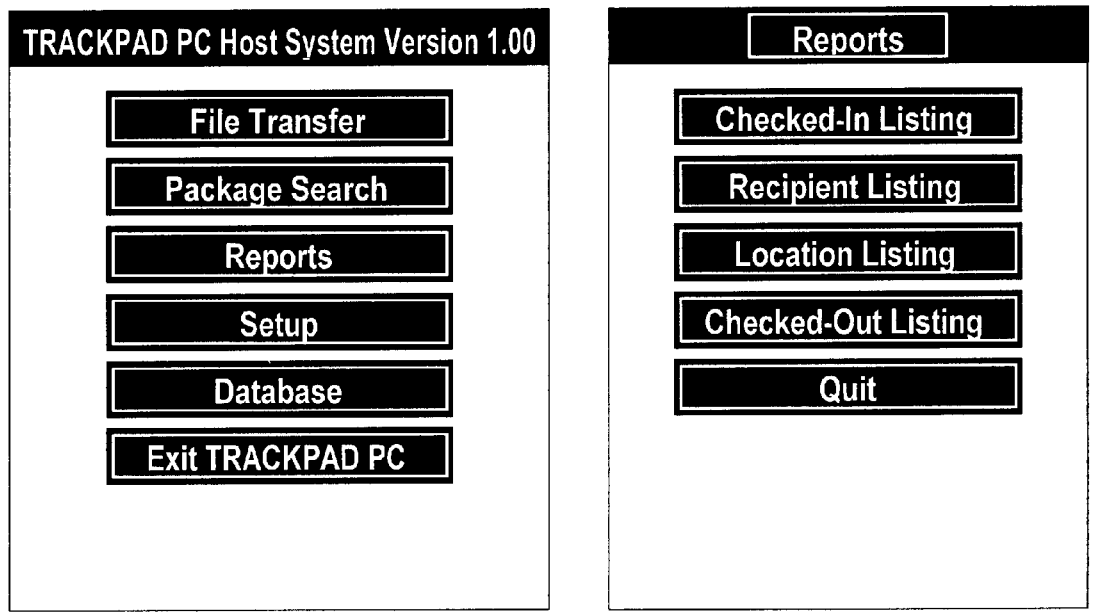
FIG. 9A     FIG. 10A

FIG. 10B

| | PRESS ANY KEY FOR NEXT PAGE | | | |
|---|---|---|---|---|
| | | THE ABC COMPANY 1032 INDUSTRY DRIVE, NOWHERESVILLE, CA 30328 | | PAGE 2 |
| DATE IN TIME IN | TRACKING # | DATE OUT TIME OUT | RECIPIENT LOCATION | SIGNATURE |
| 10/06/94 11:06 | 13150190338 | 10/06/94 11:07 | SOMERS, JEROME 1ST FLR. SYSTEM ADMINISTRATION | *Jerome Somers* |
| 10/06/94 14:54 | 1Z1968231302301382 | 10/06/94 14:56 | SMITH, JOHN 2ND FLR. DATA ENTRY AUTOMATION | *John Smith* |
| 10/06/94 14:54 | 1Z1968231302301408 | 10/06/94 14:57 | JOHNSON, BILL 2ND FLR. HUMAN RESOURCES | *Bill Johnson* |
| 10/06/94 14:54 | 1Z1968231302301391 | 10/06/94 14:57 | | |
| 10/06/94 14:54 | 1Z1968231302301417 | 10/06/94 14:58 | ROGERS, JANICE 1ST FLR. RECEPTION | *Janice Rogers* |
| 10/06/94 14:54 | 1Z1968231302301435 | 10/06/94 15:00 | ZIMMERMAN, MEGAN 2ND FLR. BILLING | *Megan Z.* |
| 10/06/94 14:54 | 1Z1968231302301426 | 10/06/94 15:00 | | |
| 10/06/94 14:54 | 1Z1968231302301453 | 10/06/94 15:01 | WRIGHT, JEFF 2ND FLR. FINANCE & ACCOUNTING | *Jeff Wright* |
| 10/06/94 14:54 | 1Z1968231302301444 | 10/06/94 15:01 | | |
| 10/06/94 14:54 | 1Z1968231302301462 | 10/06/94 15:02 | OBRIEN, PAT 1ST FLR. LOADING/UNLOADING DOCK | *Patrick O'Brien* |
| 10/06/94 14:55 | 1Z1968231302301471 | 10/06/94 15:02 | | |
| 10/06/94 14:55 | 1Z1968231302301480 | 10/06/94 15:07 | TREBLIS, HERMAN 2ND FLR. GENERAL ADMINISTRATION | *Herman Treblis* |
| 10/06/94 14:55 | 1Z1968231302301498 | 10/06/94 15:07 | | |
| 10/06/94 14:55 | 1Z1968231302301347 | 10/06/94 15:08 | ECHOLEM, Joe 2ND FLR. HUMAN RESOURCES | *Joe Echolem* |
| 10/06/94 14:55 | 1Z1968231302301356 | 10/06/94 15:08 | | |

MULTI-STAGE PARCEL TRACKING SYSTEM

This is a continuation of application Ser. No. 08/323,118 filed Oct. 14, 1994, now abandoned.

TECHNICAL FIELD

The present invention relates to parcel tracking systems using portable data entry terminals, and more particularly relates to a local parcel tracking system using a hand-held, data entry and processing unit that can perform tracking analysis on data it has collected.

BACKGROUND ARTS

Parcel delivery companies, such as United Parcel Service, have long maintained records to be able to verify deliveries. More recently, such companies have begun to guarantee overnight delivery of parcels, and therefore have a need for rapid access to information verifying on-time delivery, including a record of the signature of the recipient. The word "parcel" is used herein broadly to include any item handled by delivery services, such as packages, letters, containers, or unpackaged items.

Typically, a delivery vehicle driver leaves the vehicle with one or more parcels and a portable data acquisition device, such as the Delivery Information Acquisition Device (DIAD) device used by UPS drivers. The DIAD device includes a bar code scanner for reading a bar code label placed on the parcel by the sender, and a signature capture pad. This information is stored temporarily in the unit, and then transferred via an optical link to a docking station located in the vehicle. From this station, the information is transmitted to a central tracking computer via a cellular telephone network. Other systems use radio frequency (RF) networks to relay tracking information to a central computer.

If the sender or an intended recipient needs to know the status of the parcel, that person can access the information in the central tracking computer either by calling the parcel delivery service or by sending an inquiry from a personal computer linked by modem to the central computer. However, until the tracking information pertaining to a parcel is uploaded from the DIAD into the central computer, it is not accessible to the tracking system. In particular, if the driver delivers several parcels during one foray from the vehicle, the portable acquisition device does not have the capability to provide tracking information contained in its own memory. The information is not available until the driver returns to the vehicle and uploads the information into the central system.

Present parcel delivery tracking systems track parcels only to a customer's mail room, reception desk, or other receiving location. The customer may have a personal computer in communication with the parcel delivery service's central tracking computer to facilitate tracking of parcels sent from or received by the customer's mail room. Between the sender and the mail room of the recipient company, the tracking system may receive data (such as by scanning a bar code) at several stages of delivery, such as regional and local sorting hubs. However, in many large companies, the further process of delivering a parcel to an individual within the company and verifying such delivery is another major stage in the delivery process. Currently, convenient and automated tracking of such internal deliveries is not available. Nor is the status of the parcel during the internal delivery stage part of the tracking information available through the delivery service's central computer or through personal computer systems in the customer's mail room.

Although prior portable data acquisition terminals have included both bar code scanners and signature capture pads, the scanners have often been built in to the unit housing or provided as a wand or point-and-shoot device attached by cable to the terminal, while entry of a signature has required a separate tool in the nature of a stylus. When the scanner is built into the terminal, it may be difficult to maneuver the terminal into the correct orientation to scan a bar code. When a separate wand or the like is attached, the user has the inconvenience of looking after separate tools for scanning and signature entry.

Thus, there has been a need for a parcel tracking system that can track parcels during the internal stage of delivery after receipt of the parcel from a parcel delivery service, using an efficient device that can obtain signatures of recipients and scan codes printed on parcel labels, and can respond to tracking inquiries prior to transferring collected information to a different computer.

SUMMARY OF THE INVENTION

The present invention meets the above-described need in the art by providing a delivery tracking system capable of tracking parcels during an internal stage of delivery within an organization after receipt of the parcel from a parcel delivery service. The system utilizes an an intelligent, hand-held, portable data entry and data processing device to obtain signatures of recipients and scan codes printed on parcel labels, and to respond to tracking inquiries prior to transferring collected information to a different computer.

Generally described, the present invention provides an electronic parcel tracking system for use by an organization, comprising an intelligent hand-held, portable data entry and data processing device, which includes a wand-mounted symbol reader, a data entry and display screen capable of receiving and displaying information, including signature information, input by contact with the screen, an information storage device, a data transfer device, and a processor connected to the reader, the screen, the storage device, and the data transfer device. The processor is configured to associate and store in the information storage device data related to a particular parcel, including symbol information read by the reader, signature information acquired by the screen, and keyed information acquired by the screen, and to respond to queries about the particular parcel entered via the screen by displaying the data associated with the parcel.

Preferably, the data transfer device is selectively operable to transfer information from the information storage device to a personal computer system located at a parcel receiving location of the organization. Also, the portable data entry device may be equipped with a modem for transferring information related to a particular parcel between the information storage device and a central computer system located at a parcel delivery firm.

In a preferred embodiment, the wand-mounted symbol reader may have a transparent tip capable of inputting data into the screen by contact therewith, and thus may perform the dual functions of scanner and stylus.

In the context of multi-stage parcel delivery, the present invention might typically be used as follows. A parcel dropped at a mail room or other receiving location of an organization may be logged into a portable data entry and data processing device, such as a personal digital assistant (PDA), equipped with a wandmounted bar code reader. Logging in may be accomplished by scanning a bar code, keying in information using the data entry screen of the PDA, or downloading information from another device via a cable or an optical link. The parcel information is stored in memory in the PDA. For the internal stage of delivery, a mail room clerk or other person takes the parcel to the intended recipient or arranges for the recipient to pick up the parcel. Upon this delivery, the clerk checks out the parcel, preferably by scanning the bar code again with the wand scanner, and then having the recipient sign the screen of the PDA using the wand as a stylus.

The PDA is programmed to allow the clerk to obtain tracking information from the PDA memory by date, by time, by tracking identification number, by name of recipient, or by destination location of the intended recipient. The PDA will display the location of the parcel as well as its "scan history" within the organization and, by modem communication with a central tracking computer of the parcel delivery firm, its history prior to receipt at the mail room. At the end of a selected period of time, such as daily, the information file accumulated within the PDA memory is loaded up into an on-site personal computer (PC) using a communications interface, such as a wireless infrared link. The PC may be used to consolidate information gathered by multiple PDAs, to search for tracking information, and to display captured signatures. Many variations of the foregoing procedure are possible.

According to another aspect of the invention, an electronic data acquisition and storage apparatus is provided, comprising a touch sensitive data entry and display screen, a wand scanner configured to read bar codes and having a transparent tip capable of inputting data into the screen by contact therewith, and an information storage device connected to receive data from the screen and from the scanner. In such an apparatus, it is not necessary to provide both a scanner for acquiring bar codes or the like, and also a stylus for entering handwriting on the screen or engaging keys or buttons defined on the screen. The method of operation of such an apparatus may include the steps of scanning bar code information with the wand scanner, transmitting the bar code information to a processor in the apparatus, and engaging the tip of the wand scanner with the data entry and display screen to cause touch sensitive data entry into the processor.

Thus, it is an object of the present invention to provide an improved portable parcel tracking system.

It is a further object of the present invention to provide an intelligent hand-held, portable data entry and data processing device for parcel tracking, capable of responding to tracking queries using information acquired by and stored in the device.

It is a further object of the present invention to provide an intelligent hand-held, portable data entry and data processing device for parcel tracking capable of sharing tracking data with remote computers.

It is a further object of the present invention to provide a data entry tool capable of entering both scanned and touch generated data into an electronic data acquisition and storage apparatus.

It is a further object of the present invention to provide an efficient method of entering both scanned and touch generated data into an electronic data acquisition and storage apparatus.

Other objects, features and advantages of the present invention will become apparent upon examining the following description of preferred embodiments of the invention, when taken in conjunction with the drawings and the appended claims.

BRIEF DESCRIPTION OF THE DRAWINGS

FIGS. 4A–4F is a sequence of screens of the portable data entry and data processing device observed during parcel check-in.

FIGS. 5A–5F is a sequence of screens of the portable data entry and data processing device observed during parcel check-out.

FIGS. 7A–7F is a sequence of screens of the portable data entry and data processing device observed during an internal tracking query.

FIGS. 8A–8F is a sequence of screens of the portable data entry and data processing device observed during use of utilities related to tracking management.

FIG. 9A is a main menu screen of the mail room PC to which data is downloaded from the portable data entry and data processing device.

FIG. 9B is a screen of the mail room PC showing data transfer activity.

FIG. 10A is a report selection screen of the mail room PC.

FIG. 10B is a screen of the mail room PC showing a listing of checked-out parcels.

DETAILED DESCRIPTION

Figure 1:
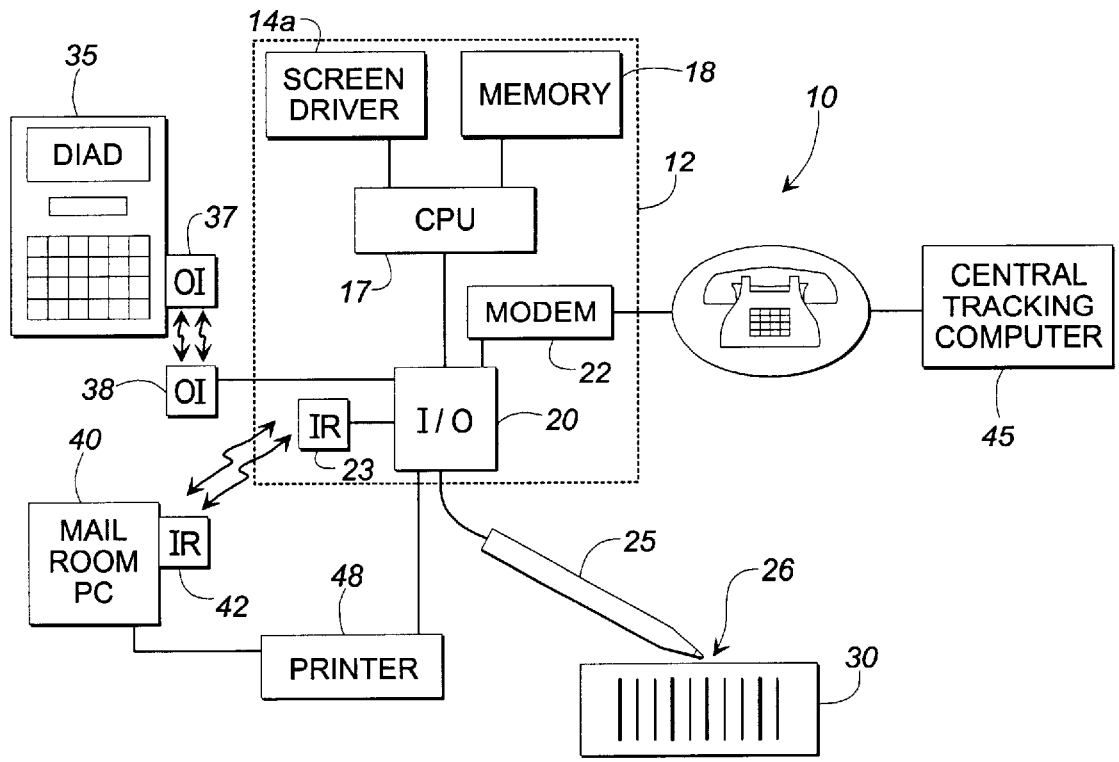
FIG. 1 is a block diagram of a parcel tracking system embodying the present invention.
Figure 2:
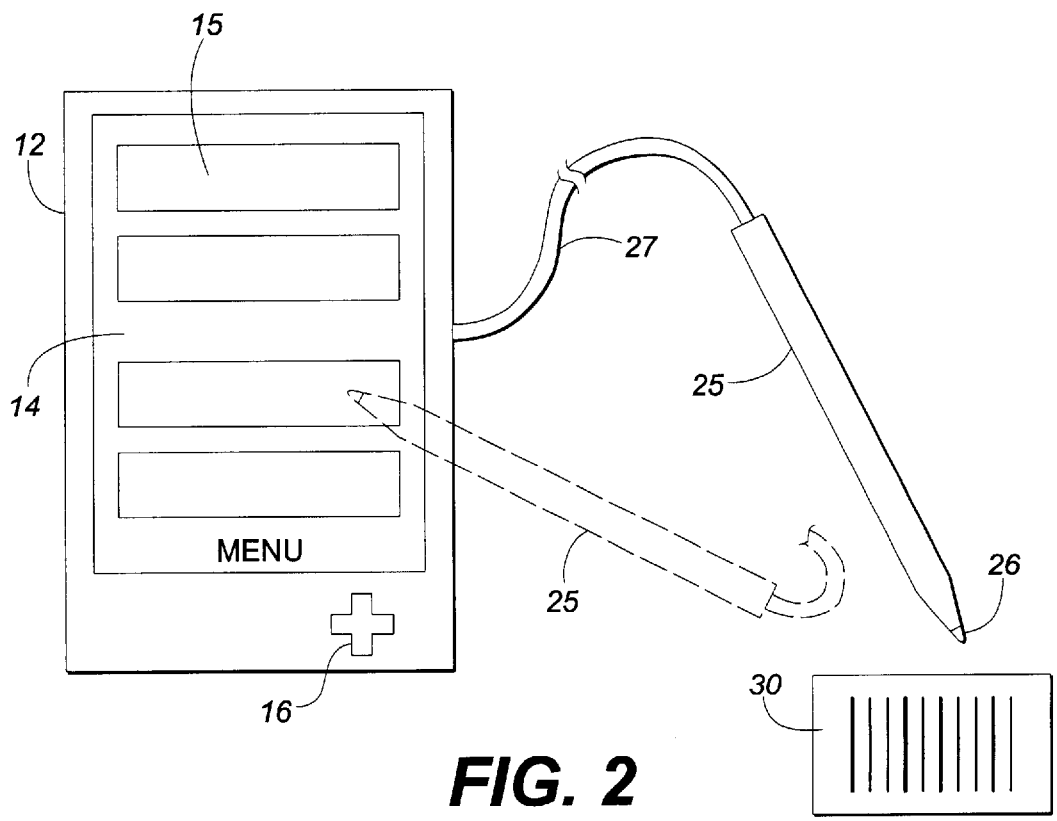
FIG. 2 is a diagrammatic front plan view of a portable data entry and data processing device utilized in the system of FIG. 1.

Referring now in more detail to the drawings, in which like numerals refer to like parts throughout the several views, FIG. 1 shows a parcel tracking system 10 embodying the present invention in block diagram form. Referring to FIGS. 1 and 2, the system 10 includes an intelligent, hand-held, portable data entry and data processing device 12, of the type known as a personal digital assistant (PDA). The PDA 12 includes a touchsensitive data entry and display screen 14 capable of interpreting handwriting and of defining button or key areas 15. For example, the screen may display a typewriter keyboard, a numeric keypad, or buttons programmed to allow a user to cause certain operations to occur. A cursor controller 16 mounted on the housing of the PDA enables movement of a cursor on the screen 14 by manual manipulation of the controller 16 in a known manner. A preferred PDA for use in connection with the present invention is model Z-7000 manufactured by Casio.

The PDA 12 includes a processor or CPU 17 which is operative to control various devices within the PDA. The processor 17 is connected to a screen driver circuit 14a, which operates the data acquisition and display functions of the screen 14. The processor also is connected to a memory device 18, which may be RAM (protected by a battery back up), a removable memory card, or other memory capable of use with a PDA. An input/output (I/O) circuit 20, connected to the processor 17, controls communications between the PDA and external devices through a modem 22, an infrared port 23, and a wand scanner 25. The modem may be an internal modem or a plug-in peripheral type, and preferably is a model XJACK fax modem card by Megahertz. The infrared port 23 is a known device commonly built into PDAs for communication with other PDAs and PCs.

The wand scanner 25 is preferably a model Scanteam 6180 by Welch Allyn. The scanner 25 includes a light source and detector for reading bar codes as the tip 25 of the wand is swept across a bar code 30 as shown in FIG. 2. The tip 25 is made of hard, transparent glass or plastic to withstand repeated drawing across surfaces on which bar codes have been printed. The scanner 25 also includes within the wand a detector for detecting the light reflected from the bar code 30 and circuitry for decoding the detector output. A resulting signal containing the contents of the bar code 30 is transmitted to the I/O circuit 20 via a cable 27 plugged into a communications port of the PDA. The wand scanner may require a battery pack (not shown) for operating power. The battery pack can be attached to the PDA 12.

The system 10 also may include a portable data acquisition device 35, such as a UPS DIAD device. The DIAD device incorporates an optical data port 37, which can transmit data to a compatible peripheral optical data port 38 that is plugged into a communications port of the PDA 12. Other portable data acquisition devices can be used, and they may be interfaced to an RS-232 port of the PDA in a conventional manner for data transfer with the PDA by known means, such as cable, RF link, infrared link, or optical link.

The system 10 may further include a personal computer 40 or other computer equipped with an infrared port 42 compatible with the infrared port 23 of the PDA 12. The infrared port 42 is preferably that sold by AST. The principal use of this infrared link in the present invention is to upload tracking information acquired by the PDA into the PC 40. The PC 40 then can be used as a station to search for or print parcel delivery status information. With appropriate programming of the PC 40 and PDA 12, information can be downloaded from the PC into the memory 18 of the PDA. As alternatives to the infrared port, data communication between the PC and the PDA may be over known means, such as cable, RF link, infrared link, or optical link.

As also shown in FIG. 1, the PDA 12 may be connected to a remote central tracking computer 45 via normal or cellular telephone lines using the modem 22 and a compatible modem in the computer 45. In this way the PDA can access tracking information stored in the central computer 45 and can receive such information from the computer 45.

A printer 48 may be included in the system and selectively connected to the PC 40 or the PDA 12 by appropriate cables.

In addition to being used to scan bar codes, the wand 25 also is used to enter data via the touch-sensitive screen 14. This is done by engaging the tip 26 of the wand against the screen to enter data either by pressing buttons or keys 15 defined by the screen display, or by writing on the screen. In particular, a recipient of a parcel may use the wand to enter his or her signature into the PDA to verify receipt of the parcel. The signature information is stored in the memory 18 and is associated with other information related to the same package, such as a tracking identification number obtained by scanning the bar code 30. A system according to the present invention needs no stylus in addition to the wand 25.

Figure 3:
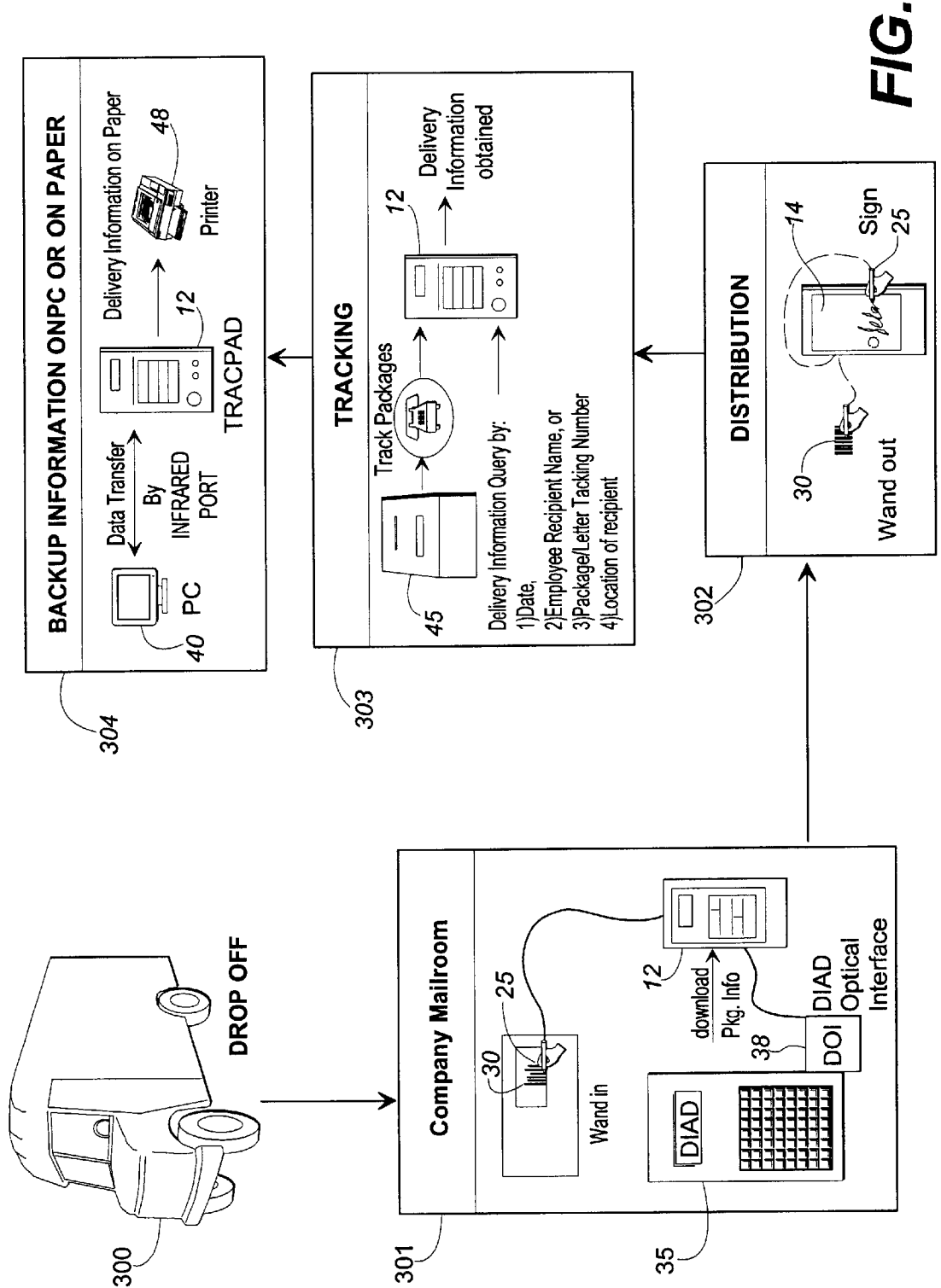
FIG. 3 is flow diagram showing the sequence of steps of the operation of a system embodying the present invention.

FIG. 3 shows diagrammatically an overview of the operation of the parcel tracking system 10, while FIGS. 4–7 show more details of the sequence of steps involved. At block 301 of FIG. 3, an employee of a parcel delivery service, such as the driver of a vehicle 300, drops off one or more parcels, packages, or letters at a mail room of a company that is a customer of the parcel delivery service. A customer employee at the site, referred to herein as a "clerk," operates the PDA to check in the items in one of two ways: (1) by scanning a bar code 30 on the item using the wand 25, or (2) by downloading the tracking information relating to the items into the PDA memory from the driver's portable data acquisition device, such as the DIAD device shown. The downloaded information may include a tracking identification number, the identity of the sender, the identity of the intended recipient, and the "scan history" of the item, namely, a list of the stations or hubs along the item's route at which the parcel delivery service scanned the bar code on the item. The downloading check-in alternative (2) will be used more often when a large number of parcels are delivered to the mail room.

Figure 4A:
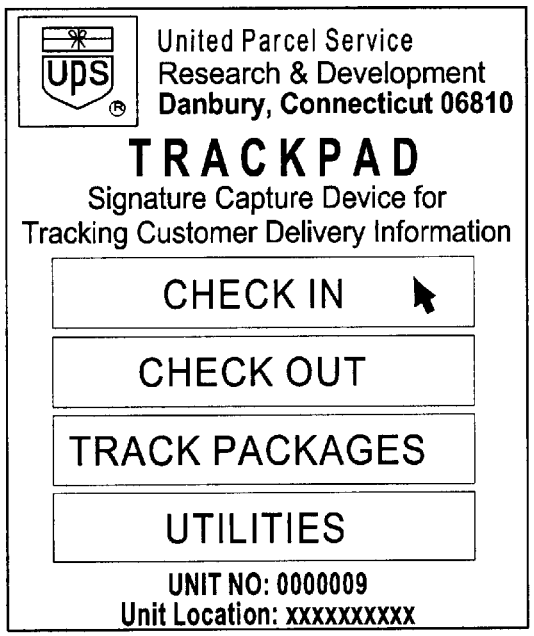
Figure 4B:
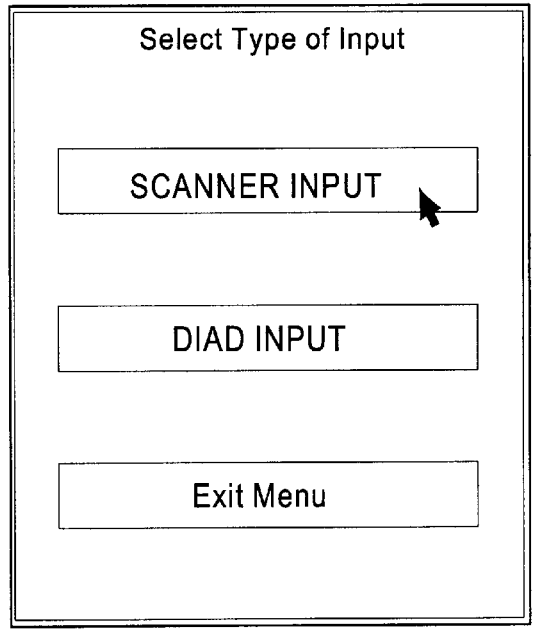
Figure 4C:
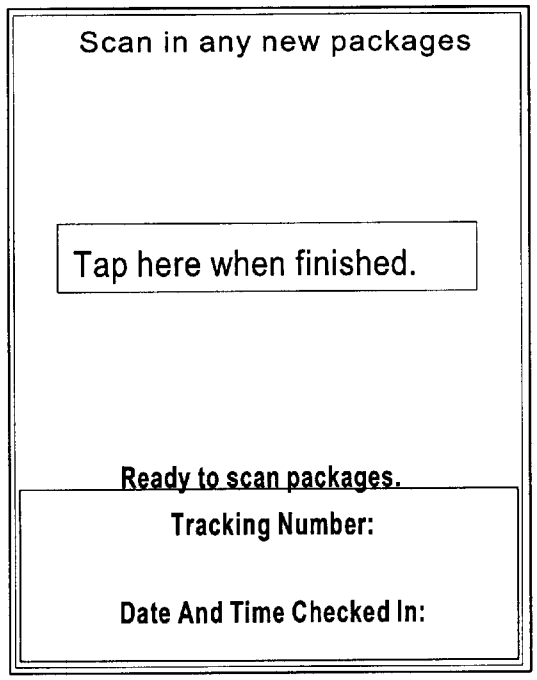
Figure 4D:
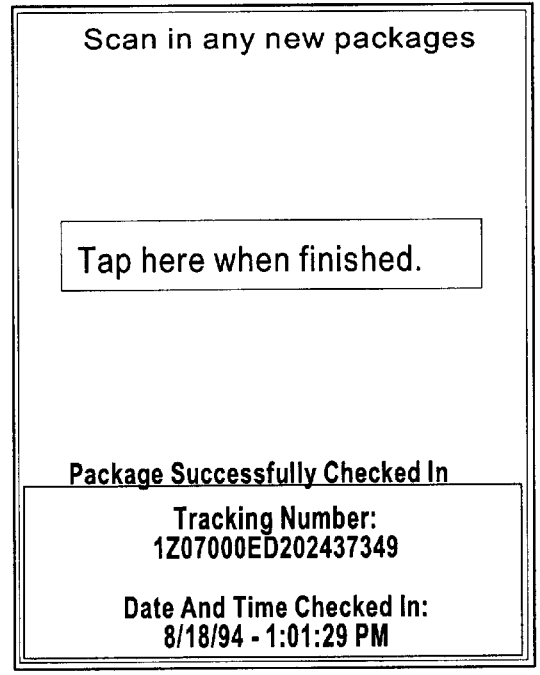

The information obtained from scanning the bar code 30 according the wand check-in alternative (1) will generally be the tracking number, which can be used to access other tracking information stored in the central tracking computer 45. The tracking number of the parcel is associated in the memory 18 with the date and time the parcel is checked in. FIG. 4 shows the sequence of PDA screens which appear during the check-in procedure. Viewing the main menu screen of FIG. 4A, the clerk "clicks" on the button "Check in Packages" or touches the button with the wand tip 26. A screen appears as in FIG. 4B, displaying a menu for selecting either "Scanner Input" or "DIAD Input". If "Scanner Input" is tapped, a new screen appears as in FIG. 4C with an instruction to scan in any new packages and a message that the PDA is ready to scan. When the clerk successfully operates the wand 25 to acquire the bar code information, the tracking number of the parcel is displayed along with the date and time it is checked in, as shown in FIG. 4D. This information is stored in the PDA memory 18. The procedure is closed by tapping the appropriate button on the screen when finished.

If "DIAD Input" is tapped, a DIAD interface screen appears as in FIG. 4E, and the clerk taps a button "DIAD receive mode," to ready the PDA for incoming data. A holding message "Waiting for Data from DIAD" is displayed. When the transfer is complete, a screen appears as in FIG. 4F indicating that a file has been created for the transferred data, the total number of parcels received, the check-in date, and the check-in time. Tapping on a "Done" button returns the clerk to the main menu.

At block 302, distribution of the parcels from the clerk to a recipient occurs. The PDA 12 is conveniently small and light weight and therefore may be carried by a mail clerk on rounds to deliver parcels to recipients at various locations around the organization. At each stop, or at the mail room if the recipient comes to pick up the parcel, the check-out procedure shown in FIG. 5 is carried out. The clerk clicks or touches the button "Check Out" as shown in FIG. 5A, and a screen is displayed as in FIG. 5B instructing the user to scan the packages to be checked out. When the clerk scans a bar code 30 using the wand 25, the tracking number of the parcel and the date and time appear on the screen, as in FIG. 5C, and a message is displayed that a package has been added successfully to the list of packages being delivered to a particular recipient. When all of such packages have been scanned, the clerk taps a button to "Continue" and views a screen as in FIG. 5D, with windows for entering the recipient's first and last names and a keyboard display for using the wand tip to tap the name into the window. Or, the screen may present a list (not shown) of possible recipients' names for selection. Such a list may be compiled from the data downloaded into the PDA at check-in. Upon entering the name, a screen as in FIG. 5E appears, presenting the clerk with a list of possible recipient locations. The clerk taps a location and it appears in a window on the screen. The clerk taps "Continue" and the screen of FIG. 5F appears. The clerk hands the PDA to the recipient, who is presented with a list of the parcels that have been delivered, and instructed to sign for them in a window. After the signature is acquired, as shown in FIG. 5F, the recipient taps a "Confirm" button to approve the verifying information and close the check-out routine, and hands the PDA back to the clerk.

Figure 6:
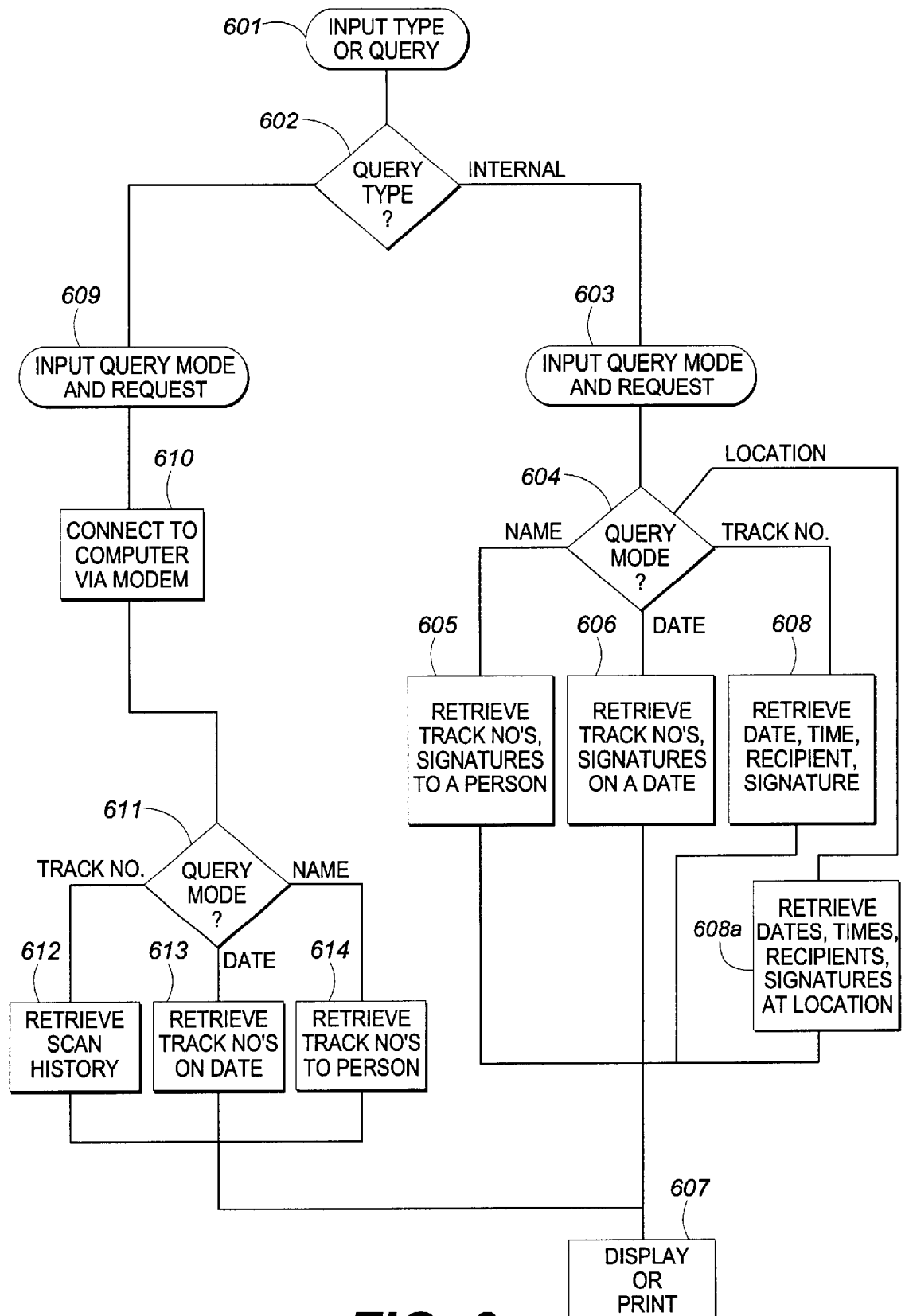
FIG. 6 is a flow diagram outlining the steps of the technique of the present invention for entering and responding to a tracking query.
Figure 7A:
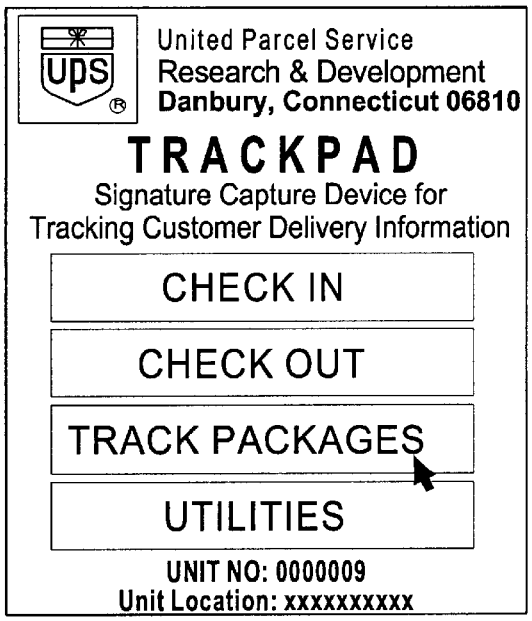
Figure 7B:
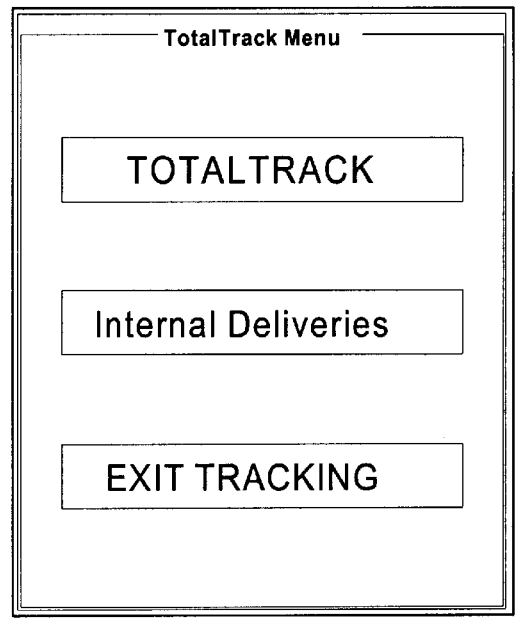

Returning to FIG. 3, at block 303 a procedure for making a tracking query is indicated. The tracking procedure is illustrated in more detail in the flow chart of FIG. 6 and the screen sequence of FIG. 7. From the main menu as shown in FIG. 7A, the clerk taps the button "Track Packages" and is presented with a query mode selection screen as in FIG. 7B for selecting "Internal Deliveries," that is, deliveries checked in or out by the PDA 12, or "TotalTrack," which refers to an external tracking database stored in the remote central computer 45. Referring to FIG. 6, upon such entry of the type of query, at block 601, the processor determines which button, internal or external query, has been tapped.

Figure 7C:
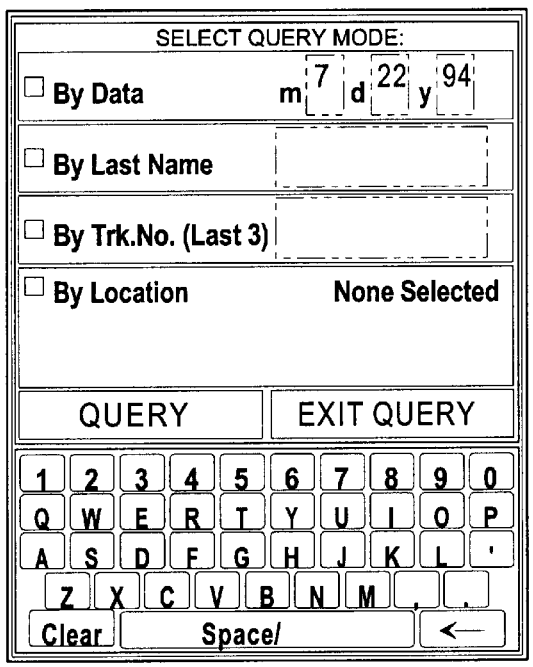
Figure 7D:
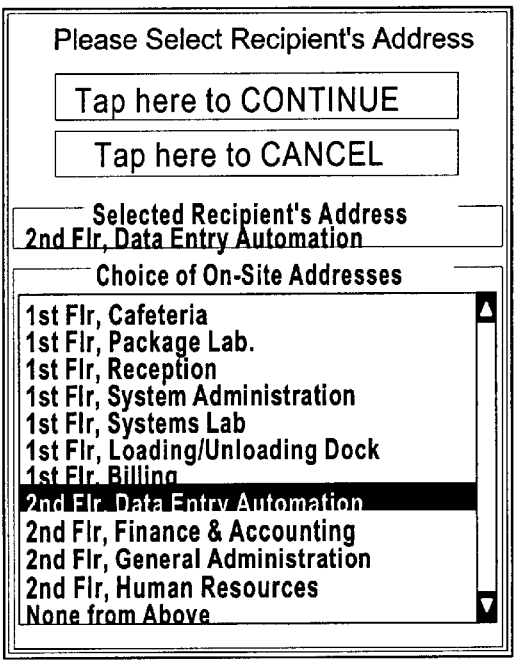

If an internal query has been selected, the clerk is presented with the screen of FIG. 7C and asked to select a query mode: by date, by name of recipient, by tracking number, or by location of intended recipients. The clerk taps the appropriate button on the screen. The clerk then may use the keypad display to enter the desired date, name, or at least the last three digits of the tracking number. If a query by location has been selected, the clerk is presented with a screen as in FIG. 7D containing a list of possible locations. Upon tapping a particular location, it is displayed in a window. The above selection step corresponds to data input block 603 in FIG. 6. After the query mode and request data have been entered, the processor determines which mode has been selected at block 604. If a recipient's name has been entered, at block 605 the processor accesses the memory 18 and retrieves a list of the tracking numbers of parcels that have been signed out to the identified person, sorted by date of delivery, and optionally the signatures associated with each delivery.

If a date has been entered, at block 606 the processor accesses the memory 18 and retrieves a list of the tracking numbers of parcels that have been signed out on that date, sorted by recipient, and optionally the recipients' signatures. This information may be displayed at block 607 in the manner shown in FIG. 7E. Information that does not fit on the screen 14 may be displayed by scrolling in a known manner.

Figures 7E, 7F, 8A, 8B:
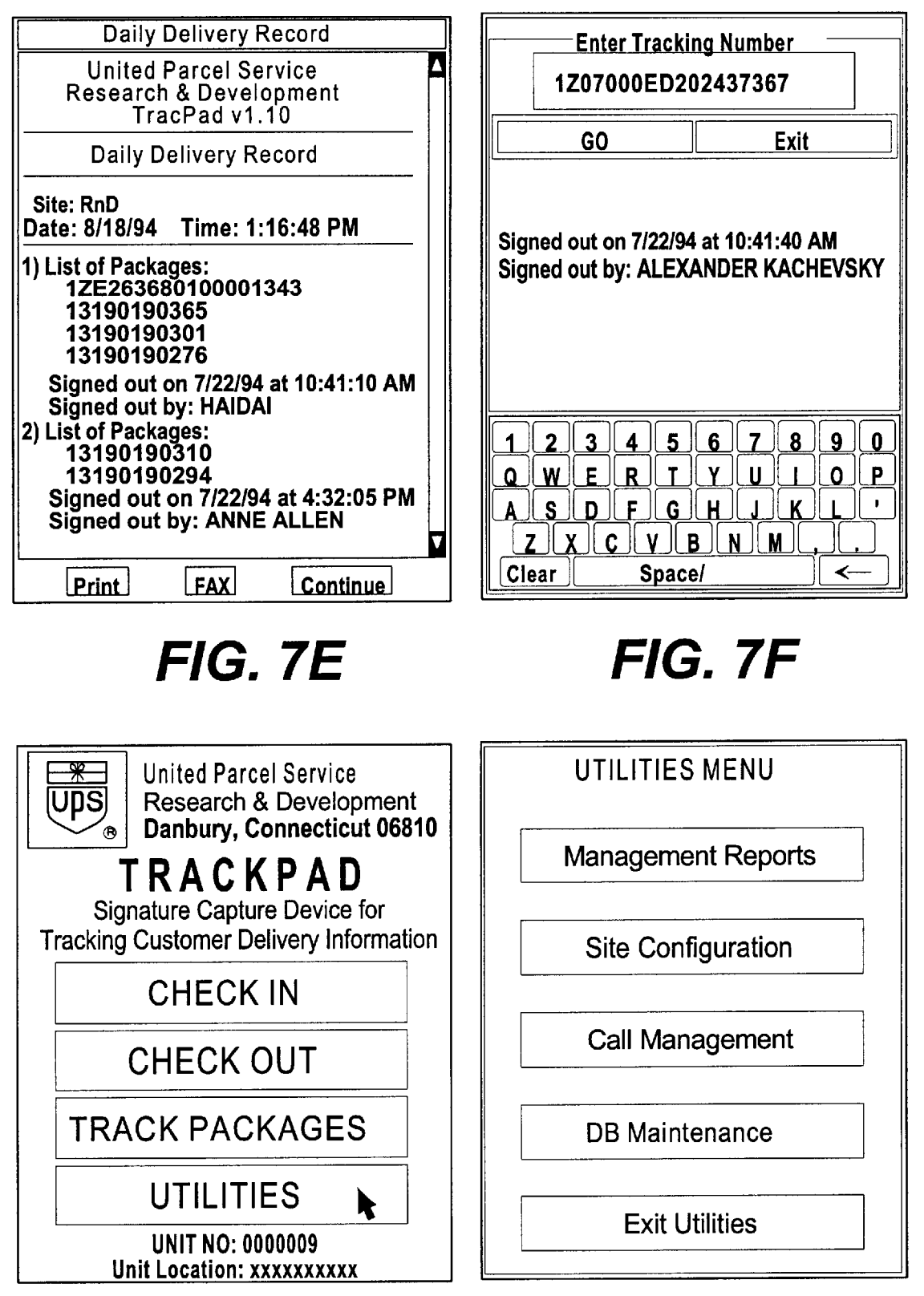

If a tracking number has been entered, at block 608 the processor accesses the memory 18 and retrieves the date and time the parcel corresponding to the tracking number was signed out, the name of the recipient, and optionally the recipient's signature. The display of the retrieved information on the PDA screen is shown in FIG. 7F.

If a recipient location has been entered, at block 608a the processor accesses the memory 18 and retrieves and displays the dates and times, the recipients' names, and optionally the signatures for all parcels delivered or to be delivered at the selected location.

Thus, tracking information acquired by the PDA 12 can be accessed at any time using the PDA, and particularly can be queried before the PDA memory has been loaded up to another computer. This is an important feature of the invention because it eliminates a period of time during which tracking information acquired and stored in a portable data acquisition device otherwise would not be accessible.

If an external query has been selected, from block 602 in FIG. 6 the logic steps to block 609 for input of a query mode directed to a database file in the central tracking computer 45. Again tracking may be enabled by tracking number, name of sender or recipient, date, or location of sender or recipient (preferably plus the name of an organization). However, appropriate security identification may be required to permit the person making the query to have access, particularly to broad lists by recipient or by date. At block 610, the processor causes the modem 22 to initiate communication with the computer 45. At block 611, the processor determines which query mode has been selected. If a tracking number has been entered, at block 612 the processor accesses the database file in the computer 45 and retrieves the scan history of the parcel associated with the entered tracking number. If a date and an organization have been entered, at block 613 a list of parcels received by the organization on the entered date is retrieved. If a sender's or recipient's name is entered, at block 614 a list of parcels sent by, received by, or in transit to the particular person is retrieved. The capability to retrieve the scan history of each parcel in these lists can be provided.

As indicated in FIG. 6, all query modes lead to block 607 for display or printing of the tracking information retrieved from the memory 18 or the computer 45. The PDA may be connected to the printer 48 in a conventional manner.

Referring again to FIG. 3, block 304 illustrates transfer of the information stored in the PDA memory 18 during distribution to the PC 40 using the infrared ports 23 and 42. The infrared port 42 associated with the PC may be of the type which intermittently polls a nearby device to determine whether data is ready to be transferred. Setting up the PC to accept data is done by selecting from a main menu shown in FIG. 9A a "File Transfer" routine, which causes the infrared port 42 to begin polling a nearby area. When a PDA is placed in the polling field of the infrared device 42, and a "PC Load" button (not shown) is tapped, the PDA is made ready to transfer data to the PC, but the PDA initially may remain inactive to conserve battery power until the PC "File Transfer" routine is initiated. The PDA infrared port 23 receives the polling signal from the device 42, and responsive to such signal becomes active and sends an identification signal to the PC. The PC then sends a command to initiate data transfer from the PDA memory to the PC. When data transfer is occurring, a screen as shown in FIG. 9B appears on the PC and an animated graphic indicator 44 displays motion in the direction of the data transfer. Transfer of data from the PDA to the PC has dual purposes of consolidating the data files of several PDAs used within an organization and providing information that can be searched at the PC for tracking needs. The printer 48 can be used for hard copy back up.

From the PC main menu screen of FIG. 9A, the user can select a "Reports" menu as shown in the screen of FIG. 10A. FIG. 10B shows a report screen generated by selecting "Checked-Out Listing" from the menu of FIG. 10A. This report, which can be printed using the printer 48, lists, for each parcel tracking number, the date in, time in, date out, time out, recipient name and location, and a display of the recipient's signature. The report "Checked-In Listing" displays the date in, time in, and, if entered or downloaded into the system, the intended recipient's name and location. The reports "Location Listing" and "Recipient Listing" may display the above described information by location or name of recipient, respectively, and indicate the status of parcels which have not yet reached their destination (for example: "not checked out"). Searching may be facilitated by providing lists of possible locations and names from which the user may select the subject of a query. All listings may be printed.

The PDA processor 17 also may carry out a series of utility routines, as shown in FIG. 8. At the main menu, shown in FIG. 8A, the user may tap the "Utilities" button to view a "Utilities Menu" screen as shown in FIG. 8B. The user may then select between "Management Reports," "Site Configuration," "Call Management," and "DB Maintenance." FIG. 8C shows the "Management Reports" screen, from which the user can cause the processor to generate a variety of reports summarizing delivery activity tracked using the PDA 12. FIG. 8D shows the "Configuration" screen from which the user may adjust address and telephone information for the mail room location, and alter the configuration of interfaces with associated devices such as the wand 25, the modem 22, and the printer 48. FIG. 8E shows the "Database Maintenance" screen which allows the user to purge or repair the tracking information in the memory 18. Upon tapping the "Purge" button, a screen as in FIG. 8F appears containing all the tracking data in the PDA memory. Using a pull-down menu at the top of the screen, as shown, the user may command the processor to sort the parcels, for example by check-in date and time, by check-out date and time, by shipper, by tracking number, or by status. For example, the user might sort the data by check-out date and time, and then delete all the records older than a selected date.

The functions of the processor 17 and associated devices are controlled by software of a type known to those skilled in the art. Programmers of ordinary skill in the art will be able to provide software to carry out the specific functions described above. Also, the textual instructions and statements presented to the user on the PDA screens may be audibly announced using voice wave files and a voice chip often built into PDAs.

In summary, the present invention provides a tracking system particularly well-suited for an internal stage of parcel delivery within an organization, but also capable of communicating with an external tracking database maintained by the parcel delivery service which delivers parcels to the organization. Within the organization, verification of the location of critical parcels becomes possible, which may be made part of a quality management or security program.

On initial delivery of parcels, the user has the ability to check them into the PDA database using the attached bar code wand scanner or the key entry capabilities of the PDA touch-sensitive screen. On delivery within the organization to the intended recipient, the user has the ability to scan the parcel bar code or enter the recipient's employee number, and to capture the recipient's signature. No separate stylus is required for screen data entry. Delivery information query management allows the user to obtain tracking information by date, by tracking number, or by employee name or number or location. Communication by modem permits further tracking via the delivery service's remote database. Information can be loaded up to a PC for consolidation with similar information from other PDAs. The PC then can be used for tracking, display of signatures, data back up, and printing hard copies of delivery information covering periods of time, such as a day, a week, or a month It will further be understood that various changes in the details, materials, and arrangements of the parts and parameters which have been described and illustrated to explain the nature of the invention may be made by those skilled in the art without departing from the principle and scope of the invention as expressed in the following claims.

What is claimed is:

1. An electronic parcel tracking system for use by an organization, comprising:
    an intelligent hand-held, portable data entry and data processing device, including:
    a wand-mounted symbol reader including a stylus tip;
    a data entry and display screen capable of receiving and displaying information input by use of said stylus tip, including signature information;
    an information storage device;
    a data transfer device; and
    a processor connected to said reader, said screen, said storage device, and said data transfer device;
    said processor being configured to
        associate and store in said information storage device data related to a particular parcel, including symbol information read by said reader, signature information acquired by said screen, and keyed information acquired by said screen; and
        respond to user queries about said particular parcel entered via said screen by retrieving the stored data associated with said parcel from the storage device and displaying said data associated with said parcel on said display screen prior to transferring the data associated with said parcel in said information storage device to another computer.

2. The system of claim 1, further comprising:
    a personal computer system located at a parcel receiving location of said organization;
    said data transfer device being selectively operable to transfer information from said information storage device to said personal computer.

3. The system of claim 1, further comprising a central computer system located at a parcel delivery firm; and wherein said portable data entry device further comprises a modem for transferring information related to said particular parcel between said information storage device and said central computer system.

4. The system of claim 3, wherein said processor is configured to respond to queries about said particular parcel entered via said screen by initiating communication with said central computer system via said modem, and displaying data associated with said parcel stored in said central computer system.

5. The system of claim 1, wherein said processor is configured to respond to said queries made by name of recipient, by date, by a parcel tracking number, or by destination.

6. An electronic parcel tracking system for use by an organization, comprising:
    an intelligent hand-held, portable data entry and data processing device, including:
    a wand-mounted symbol reader;
    a data entry and display screen capable of receiving and displaying information input by contact therewith, including signature information;
    an information storage device;
    a data transfer device; and
    a processor connected to said reader, said screen, said storage device, and said data transfer device;
    said processor being configured to
        associate and store in said information storage device data related to a particular parcel,including symbol information read by said reader, signature information acquired by said screen, and keyed information acquired by said screen; and
        respond to user queries about said particular parcel entered via said screen by retrieving the stored data associated with said parcel from the storage device and displaying said data associated with said parcel on said display screen prior to transferring the data associated with said parcel in said information storage device to another computer; and a personal computer system located at a parcel receiving location of said organization;

said data transfer device being selectively operable to transfer information from said information storage device to said personal computer and from said personal computer to said information storage device.

7. The system of claim 6, further comprising a central computer system located at a parcel delivery firm; and wherein said portable data entry device further comprises a modem for transferring information related to said particular parcel between said information storage device and said central computer system.

8. The system of claim 7, wherein said processor is configured to respond to queries about said particular parcel entered via said screen by initiating communication with said central computer system via said modem, and displaying data associated with said parcel stored in said central computer system.

9. The system of claim 6, wherein said processor is configured to respond to said queries made by name of recipient, by date, by a parcel tracking number, or by destination.

10. An electronic parcel tracking system for use by an organization, comprising:

an intelligent hand-held, portable data entry and data processing device, including:
a symbol reader;
data entry and display screen capable of receiving and displaying information input by contact therewith, including signature information;
an information storage device;
a data transfer device; and
a processor connected to said reader, said screen, said storage device, and said data transfer device;
said processor being configured to
associate and store in said information storage device data related to a particular parcel, including symbol information read by said reader, signature information acquired by said screen, and keyed information acquired by said screen; and
respond to user queries about said particular parcel entered via said screen by retrieving the stored data associated with said parcel from the storage device and displaying said data associated with said parcel on said display screen prior to transferring the data associated with said parcel in said information storage device to another computer; and a personal computer system located at a parcel receiving location of said organization;

said data transfer device being selectively operable to transfer information from said information storage device to said personal computer and from said personal computer to said information storage device.

11. The computer system of claim 10, further comprising a central computer system located at a parcel delivery firm; and wherein said portable data entry device further comprises a modem for transferring information related to said particular parcel between said information storage device and said central computer system.

12. The system of claim 11, wherein said processor is configured to respond to queries about said particular parcel entered via said screen by initiating communication with said central computer system via said modem, and displaying data associated with said parcel stored in said central computer system.

13. The system of claim 10, wherein said processor is configured to respond to said queries made by name of recipient, by date, by a parcel tracking number, or by destination.

* * * * *